Patented Jan. 13, 1942

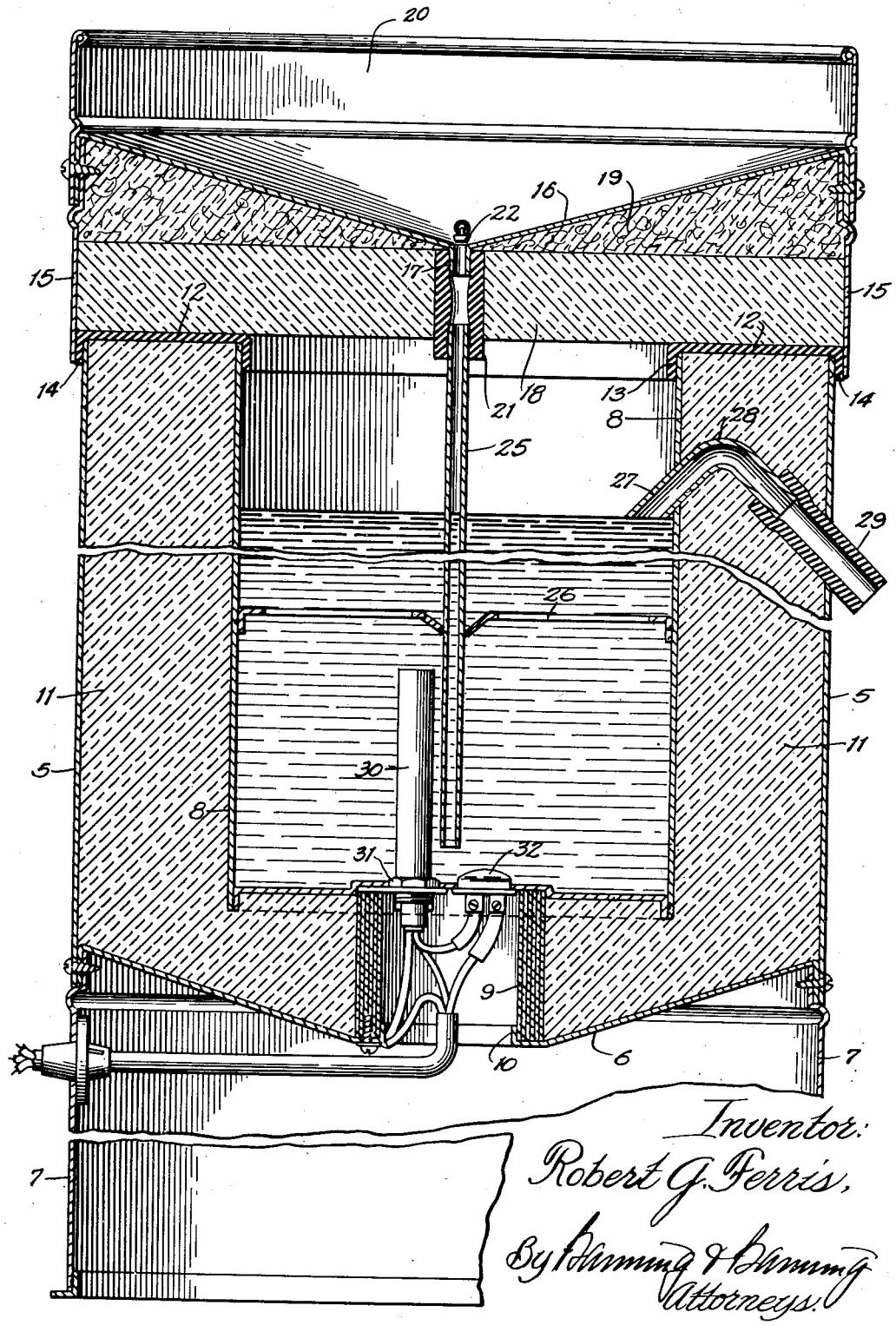

2,269,448

UNITED STATES PATENT OFFICE 2,269,448

WATER HEATER

Robert G. Ferris, Harvard, Ill., assignor to Starline, Inc., Harvard, Ill., a corporation of Illinois Application March 27, 1940, Serial No. 326,226

3 Claims. (Cl. 219—38)

My present invention, which relates to certain new and useful improvements in a water heater, is a continuation-in-part of my earlier application filed December 24, 1938, under Serial No. 247,617.

One object is to provide an improved water heater of the storage type from which hot water is discharged by the introduction of cold water, the heater remaining full, or substantially so, at all times. Another object is the provision of means in a heater of this type for preventing the discharge pipe from overflowing or dripping due to expansion or vaporization of the water during heating. Another object is the provision of a removable head whereby to facilitate cleaning of the interior of the tank. And a still further object is the provision of hollow supporting means for the tank affording a simple and strong construction and one in which the electrical connections leading to a heating element are readily accessible and yet fully protected.

These and other objects will appear from the following description wherein reference is made to a suggestive embodiment of the invention shown in the accompanying drawing which shows a vertical section through the present water heater.

The heater comprises a tank unit having a casing with side walls 5, preferably cylindrical, and with a centrally apertured, downwardly sloping, conical bottom 6, the whole being supported upon a base wall 7. The top of the casting is open.

Positioned within the casing and in spaced relation therewith, is an open top shank 8 whose bottom may be upwardly embossed to fit around a support 9, preferably made of a fibrous insulating sheet which is wound into a hollow cylinder. This cylinder may be rested upon the casing bottom adjacent its aperture where an upturned flange 10 is provided both for strength and for centering of the cylindrical support. The space between the casing and tank is filled with a suitable packing 11, preferably glass wool which provides a desirable insulation whereby heated water within the tank may remain so over a prolonged period.

The tank is maintained centrally within the casing with the aid of a channel ring 12 having inner and outer depending flanges 13 and 14 adapted to engage fixedly with the walls of the tank and casing, respectively, adjacent their upper ends. This ring is preferably made from some suitable insulating material, such as rubber, so as to minimize heat losses, and its fit upon the walls of the casing and tank may be such as to provide an effective seal which will prevent leakage of liquid from within the tank to the space exteriorly thereof.

Associated with the tank unit just described is a removable head having an outer wall 15 within the confines of which is a receptacle which may take the form of a funnel-shaped bowl 16 sloping downwardly to a central drain opening where I have provided a depending nipple 17. Below the bowl is a solid insulating disk 18 made from some such material as vaporsealed Celotex, and above the disk in the space below the bowl is a suitable insulating packing 19, such as glass wool. By such a construction the head, which may be removed from the tank unit, provides an effective insulation over the top thereof. In order to enhance the bowl capacity, the head may carry an upper extension wall 20, as shown.

The drain nipple, as shown, is connected with a short sleeve 21, preferably of rubber, which extends downwardly through the head to a point below its bottom which is afforded by the disk 18. A plug 22 may be used to close the drain opening when desired. In line with the sleeve so as to connect therewith is a filler pipe 25 which is supported loosely within the tank as by a spider plate 26 which may serve additionally as a baffle. This pipe serves as an inlet connection for the tank. The upper end of the filler pipe is shown as fitted within the lower end of the sleeve with which it remains connected even when the head is to be removed. The filler pipe extends vertically into the tank to a point near its bottom.

An outlet connection for the tank is provided in a siphon tube 27 which passes through its walls with which it is in sealed connection at a point near its upper end. This tube, which is of larger diameter than the filler pipe, proceeds first upwardly, is then bent at 28 at its topmost point, and then proceeds downwardly to connect with a discharge hose 29 or the like which extends outwardly through the casing. The lower end of the hose terminates below the inlet end of the tube 27 whereby the tube in its entirety may serve as a siphon for the discharge of water from the tank, as will presently appear.

An electrical heating unit 30 projects upwardly into the tank from a socket 31 into which it is fitted, the socket being mounted within an opening in the bottom of the tank and sealed in connection therewith. A thermostat 32, preferably of the Spencer disk type, is also extended through the bottom of the tank with which it is sealed. Suitable electrical connections extend between the heating unit, the controlling thermostat therefor, and a source of energy exteriorly of the tank unit, all such connections being properly protected in accordance with approved practice. Since these connections proceed through the hollow support whose bottom is open, it follows that they are readily accessible and also amply protected.

To withdraw hot water from the tank, water is poured into the bowl at the top, thereby causing heated water to flow up and through the siphon tube and discharge hose in connection therewith, this discharge continuing as long as water remains in the bowl. Even after the bowl is emptied, water will continue to discharge from the hose until the level of water in the tank drops below the inlet end of the siphon tube, at which time air enters therein to break the vacuum. After that no further discharge will occur even though there be the usual expansion of water in the tank due to rise in temperature thereof. The siphon tube is desirably larger than the filler pipe 25 so as to prevent overflowing, no matter how much water be placed in the bowl to await passage into the tank. The thermostat may be adjusted to close and open the circuit at, for example, 130° F. and 170° F., respectively, consequently any cold water added through the filler pipe 25 will cause the circuit to close and the heater to operate until the water is brought to the desired temperature when the thermostat will automatically open the circuit again.

One of the outstanding features of my invention is the ease and facility with which the head may be removed so as to expose the tank for cleaning or emptying. In certain uses for which my heater is particularly adapted, such as supplying water for cleaning milk cans on farms, it is possible that the cleaning water will be poured back into the heater for reheating. In so doing, a deposit is soon built up within the tank to hamper its utility. Frequent and thorough cleanings may therefore be important, and the means by which my heater is adapted to be disassembled, cleaned, and re-assembled is an outstanding advantage. Another feature of advantage is the support of the tank within the casing without the use of any metallic parts. This applies to the hollow cylindrical support at the bottom, the lateral ring support at the top, and even the connections (rubber) between the tank and the filler pipe on the one hand and the siphon tube on the other hand. By such a construction I minimize heat losses—an important consideration in a heater of the storage type.

I claim:

1. A water heater comprising a casing having therein an open liquid tank of a size to thereby provide a space therearound and being filled with insulating material, means for heating the liquid therein, heat insulating and water sealing means supporting the tank in a fixed position spacially related to the casing, normally open inlet and outlet connections for the tank, an insulated head removably fitted over the casing and tank in a fixed position thereon adapted to provide a closure therefor, a receptacle combined with the head and open upon the upper side thereof, and means extending through the head establishing communication between the receptacle associated therewith and the inlet connection, the head, receptacle and inlet connection as a unit being removable and replaceable relative to the casing and tank therewithin.

2. A water heater comprising a casing having therein an open liquid tank of a size to thereby provide a space therearound and being filled with insulating material, means for heating the liquid therein, heat insulating and water sealing means supporting the tank in a fixed position spacially related to the casing, normally open inlet and outlet connections for the tank, an insulated head removably fitted over the casing and tank in a fixed position thereon adapted to provide a closure therefor, a receptacle associated with the head and located at a point thereabove, and means extending through the head establishing communication between the associated receptacle and the inlet connection adapted, when a supply of liquid is maintained in the receptacle, to conduct liquid therefrom into the tank.

3. A water heater comprising a casing having therein an open liquid tank of a size to thereby provide a space therearound and being filled with insulating material, means for heating the liquid therein, heat insulating and water sealing means supporting the tank in a fixed position spacially related to the casing, normally open inlet and outlet connections for the tank, an insulated head removably fitted over the casing and tank in a fixed position thereon adapted to provide a closure therefor, a receptacle associated with the head and located at a point thereabove, and means establishing communication between the associated receptacle and the inlet connection adapted, when a supply of liquid is maintained in the receptacle, to conduct liquid therefrom into the tank.

ROBERT G. FERRIS.